UNITED STATES PATENT OFFICE.

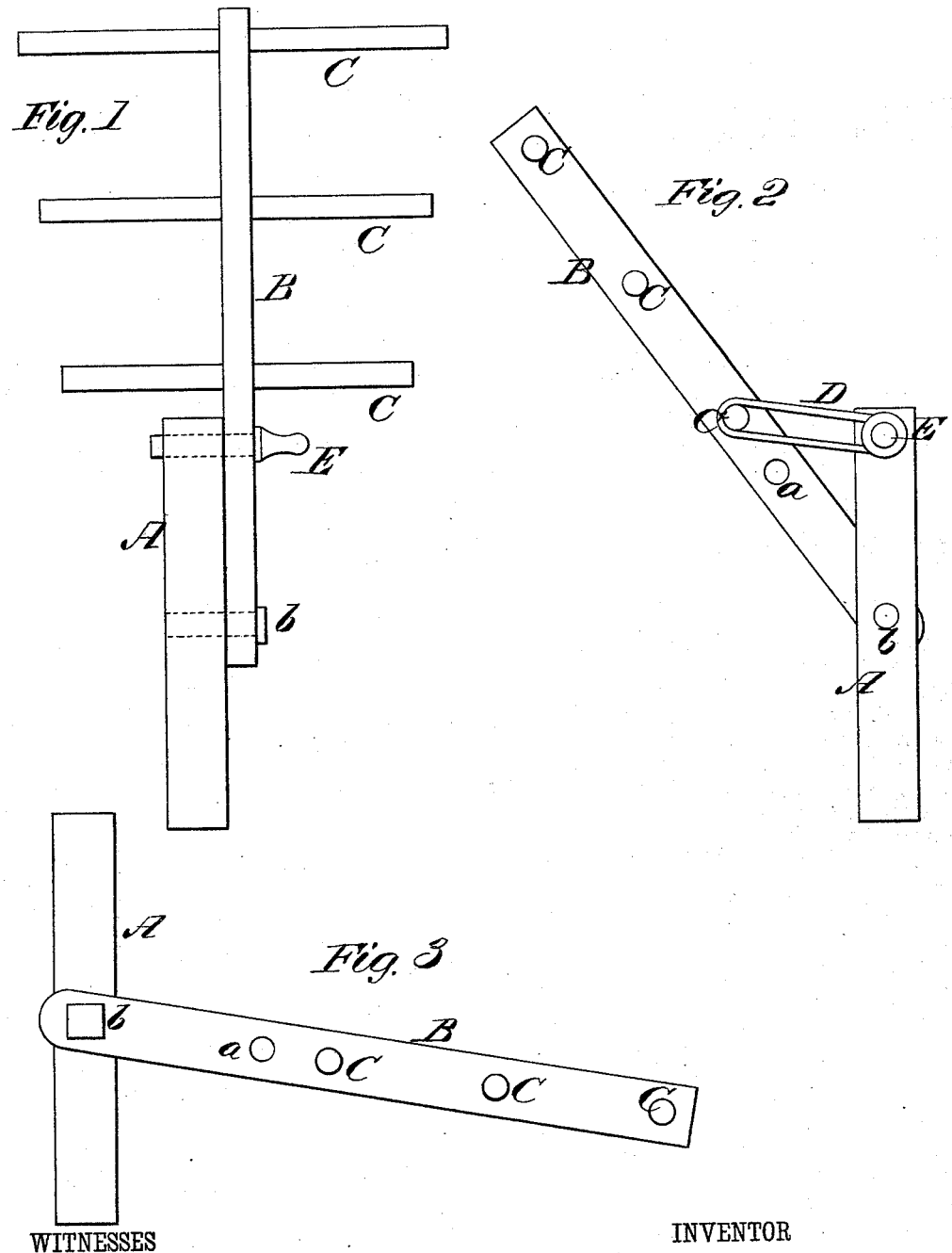

JOHN McDONALD, OF NORTH MANCHESTER, INDIANA, ASSIGNOR OF TWO-THIRDS HIS RIGHT TO BENJAMIN F. BROWER AND DAVID SILER, JR., OF SAME PLACE.

IMPROVEMENT IN GRAPE-VINE TRELLISES.

Specification forming part of Letters Patent No. 156,097, dated October 20, 1874; application filed August 29, 1874.

*To all whom it may concern:*

Be it known that I, JOHN McDONALD, of North Manchester, in the county of Wabash and State of Indiana, have invented a new and valuable Improvement in Grape-Vine Trellis; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a front view of my grape-vine trellis. Fig. 2 is a side view, and Fig. 3 is a side view of the same.

The object of this invention is to facilitate the culture of grapes and the gathering of the same by the employment of a link which is applied over one of the bars of a vibrating trellis and over a pin in an upright supporting the same, whereby it may be held at any desired angle to facilitate the gathering of fruit, or may be vibrated into a position for exposing the under side of the vines to the action of the sun, for the purpose of causing a speedy and simultaneous ripening of the fruit, as will be fully understood from the following description.

In the annexed drawings, A designates a post, which is firmly secured in the ground; and B designates a bar, which is pivoted at $b$ to the post A, and held in an upright position by a pin, E, inserted into holes $a$ $a'$. This bar B is provided with cross-pieces C, on which the vines are trained, which pieces may be of any suitable length, as they will not interfere with the adjustment of the trellis. By removing the pin E the trellis can be adjusted on the ground in the position shown in Fig. 3 for the purpose of protecting the vines during the winter season, and also for convenience in gathering the grapes. By applying a link, D, over the lowest cross-piece, C, and also over the pin E, the trellis will be sustained in an inclined position for exposing the vines to the sun to the best advantage. In this way either side of the trellis can be turned upward.

What I claim as new, and desire to secure by Letters Patent, is—

In a vibrating grape-vine trellis, the combination of the link D with the bar C, horizontally arranged upon the bar B pivoted to the post A, and the pin E passed into a perforation upon the upper end of the said post, as and for the purpose described.

In testimony that I claim the above I have hereunto subscribed my name in the presence of two witnesses.

JOHN McDONALD.

Witnesses:
J. B. HARTER,
OWEN SWITZER.